C. L. HART.
Cane-Stripper.
No. 56,747.  Patented July 31, 1866.
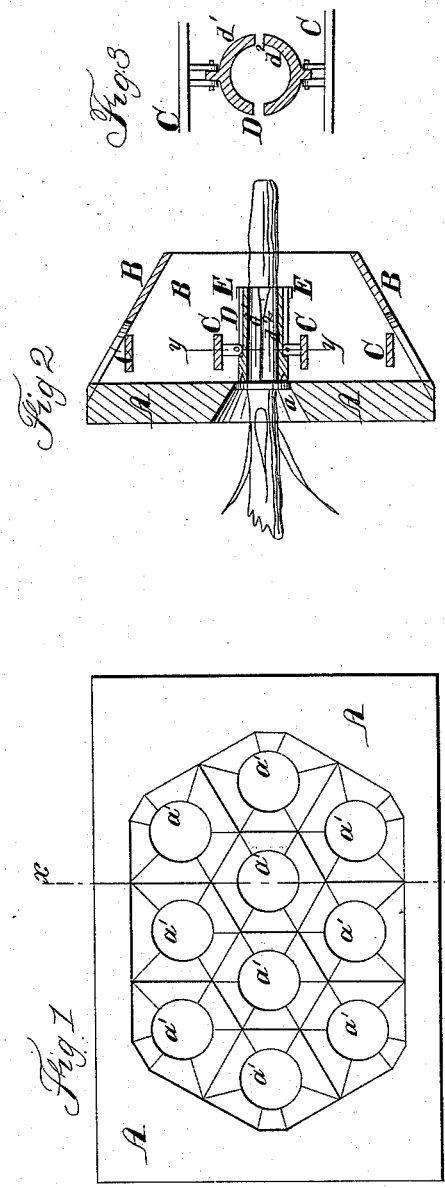

UNITED STATES PATENT OFFICE.

C. L. HART, OF MATTOON, ILLINOIS.

IMPROVEMENT IN SORGHUM STRIPPER AND CUTTER.

Specification forming part of Letters Patent No. 56,747, dated July 31, 1866.

*To all whom it may concern:*

Be it known that I, C. L. HART, of Mattoon, in the county of Coles and State of Illinois, have invented a new and useful Improvement in Sorghum or Cane Stripper; and I do hereby declare that the following is a full, clear, and exact description thereof, which will enable others skilled in the art to make and use the same, reference being had to the accompanying drawings, forming part of this specification, in which—

Figure 1 is a face view of my improved sorghum-stripper. Fig. 2 is a sectional view of the same, taken through the line $x$ $x$, Fig. 1. Fig. 3 is a detail sectional view of the same, taken through the line $y$ $y$, Fig. 2.

Similar letters of reference indicate like parts.

My invention has for its object to furnish an apparatus for stripping the leaves and superfluous coverings from the stalks of sorghum and sugar-cane; and it consists, first, in the use of a plate having holes formed through it, through which the stalks are passed to be stripped, said holes being circular at the inner side or face of the plate and polygonal at the outer side or face of the said plate; second, in the frame or covering and spring-bars, in combination with each other and with the perforated plate; third, in the stripping-tubes, constructed as hereinafter described, in combination with the spring-bars and with the perforated plate.

A is the plate, which is perforated with round holes $a'$. The outer side or face of the plate is laid off into polygonal figures of such a number of sides that the spaces between the said holes $a'$ shall decline from a line or edge at the outer surface to the circle at the inner surface, as shown in Figs. 1 and 2. By this construction, with whatever part of the plate the ends of the stalks may come in contact, they will be guided into one or the other of these holes $a'$.

To the edge of the plate A is attached the frame or covering B, the sides of which incline inward, as shown in Fig. 2, so as to guide the stalks into such a position that they may be grasped by the crusher and drawn through the apparatus.

The sides of the frame B are cut out, as shown in Fig. 2, for convenience in cleaning the apparatus or observing its working.

C are spring-bars attached to the ends of the frame B, and extending longitudinally across the said frame B at a little distance from the plate A, as shown in Fig. 2. These bars C should be made of spring-steel, so that when sprung from their places by the passage of a large stalk they may instantly recover it again.

D are the stripping-tubes, which are made in two parts, as shown in Figs. 2 and 3. Each of these parts or halves $d'$ and $d^2$ are pivoted to the spring-bars C, as shown in Figs. 2 and 3, and their edges near the inner ends are rounded off, as shown in Fig. 2, so that by drawing the said inner ends of the tubes together their outer ends may be drawn away from the holes $a'$ of the plate A, so as not to interfere with the ready introduction of the stalks of the cane.

The ends of the tubes that are nearest to the plate A are grooved with a circular groove, the inner side of which is formed into an edge, as shown in Fig. 2, for cutting off the leaves, &c., of the stalks as they are drawn through the tubes.

E is an elastic band placed around the inner end of the tubes D, and which draws the inner ends, $d'$ and $d^2$, of the tube together, which spreads their outer ends apart, so that they may not interfere with the entrance of the stalks into the said tube D. As soon as the advancing ends of the stalks have passed the pivoting-points of the parts $d'$ and $d^2$ of the tube they press the said inner ends apart, which draws the outer ends of said parts together, causing them to closely embrace the stalk and strip off all the leaves or superfluous coverings therefrom. As soon as the stalk has been drawn from the apparatus by the crusher the elasticity of the band E draws the inner ends of the said parts together and opens their outer ends, ready to receive another stalk.

I claim as new and desire to secure by Letters Patent—

1. The use of the plate A in a sorghum-stripper, when perforated substantially in the manner herein described, and for the purpose set forth.

2. The frame or covering B and spring-bars C, in combination with each other and with the perforated plate A, substantially as described, and for the purpose set forth.

3. The stripping-tubes D, constructed and arranged as herein described, in combination with the spring-bars C and with the perforated plate A, substantially as described, and for the purposes set forth.

C. L. HART.

Witnesses:
   D. H. TUCKER,
   C. E. TREMBLE.